United States Patent
Katsaros et al.

(10) Patent No.: US 9,689,428 B2
(45) Date of Patent: Jun. 27, 2017

(54) BEARING RING INCLUDING A TEMPERATURE COMPENSATION RING, BEARING INCLUDING THE BEARING RING, AND METHOD FOR MANUFACTURING A BEARING RING

(71) Applicants: Padelis Katsaros, Schweinfurt (DE); Rainer Spies, Donnersdorf (DE)

(72) Inventors: Padelis Katsaros, Schweinfurt (DE); Rainer Spies, Donnersdorf (DE)

(73) Assignee: AKTIEBOLAGET SKF, Gothenburg (SE)

( * ) Notice: Subject to any disclaimer, the term of this patent is extended or adjusted under 35 U.S.C. 154(b) by 0 days.

(21) Appl. No.: 14/698,279

(22) Filed: Apr. 28, 2015

(65) Prior Publication Data
US 2015/0308504 A1    Oct. 29, 2015

(30) Foreign Application Priority Data
Apr. 28, 2014   (DE) .................. 10 2014 207 922

(51) Int. Cl.
| F16C 33/58 | (2006.01) |
| F16C 27/06 | (2006.01) |
| F16C 33/64 | (2006.01) |
| F16C 35/077 | (2006.01) |
| F16C 19/52 | (2006.01) |

(Continued)

(52) U.S. Cl.
CPC .......... *F16C 33/586* (2013.01); *F16C 19/525* (2013.01); *F16C 25/08* (2013.01); *F16C 27/066* (2013.01); *F16C 33/64* (2013.01); *F16C 35/077* (2013.01); *F16C 19/364* (2013.01); *Y10S 384/905* (2013.01)

(58) Field of Classification Search
CPC ...... F16C 19/364; F16C 19/525; F16C 25/08; F16C 25/083; F16C 27/066; F16C 33/64; F16C 33/586; F16C 35/077; F16C 2202/22; Y10S 384/905
USPC ....... 384/125, 517, 557, 561, 564–565, 571, 384/584, 605, 905, 120; 264/265, 274
See application file for complete search history.

(56) References Cited

U.S. PATENT DOCUMENTS 2,141,145 A * 12/1938 Wooler ................. F16C 19/385
                                                                    16/107
2,700,581 A *  1/1955 Migny .................. F16D 1/0835
                                                                    384/278
(Continued)

FOREIGN PATENT DOCUMENTS

DE         69131756 T2      3/2000
DE      102005043954 A1 *   3/2007  .............. F16C 19/26
(Continued)

*Primary Examiner* — Marcus Charles
(74) *Attorney, Agent, or Firm* — Bryan Peckjian; SKF USA Inc. Patent Dept.

(57) ABSTRACT

A bearing ring includes a temperature compensation ring made from an elastic material vulcanized or otherwise materially bonded onto an outer surface of the bearing ring, the outer surface being oriented in a radial direction. The bearing ring includes a radially encircling groove, and in an unloaded state of the temperature compensation ring, that is, independently of an application of axial pressure against the temperature compensation ring, the temperature compensation ring fills the groove in an interference-fit manner.

12 Claims, 2 Drawing Sheets

(51) Int. Cl.
*F16C 25/08* (2006.01)
*F16C 19/36* (2006.01)

(56) References Cited

U.S. PATENT DOCUMENTS

| | | | | |
|---|---|---|---|---|
| 2,803,507 A * | 8/1957 | Mempel | ............... | F16C 27/066 |
| | | | | 384/536 |
| 2,859,033 A * | 11/1958 | Rose | ................... | F16C 27/066 |
| | | | | 267/153 |
| 4,569,602 A * | 2/1986 | Lundgren | ............ | F16C 13/006 |
| | | | | 384/499 |
| 4,718,781 A * | 1/1988 | Gerard | ................. | F16C 19/166 |
| | | | | 384/495 |
| 5,028,152 A | 7/1991 | Hill | | |
| 5,857,782 A * | 1/1999 | Waskiewicz | ......... | F16C 23/084 |
| | | | | 384/493 |
| 8,591,120 B2 | 11/2013 | Ince et al. | | |
| 8,684,608 B2 * | 4/2014 | Ince | ..................... | F16C 19/182 |
| | | | | 384/493 |
| 8,690,445 B2 * | 4/2014 | Doerrfuss | ............ | F16C 19/163 |
| | | | | 384/493 |
| 8,696,206 B2 * | 4/2014 | Lunz | .................... | F16C 19/364 |
| | | | | 384/563 |
| 8,905,643 B2 * | 12/2014 | Ince | ...................... | F16C 35/073 |
| | | | | 384/493 |
| 9,222,508 B2 * | 12/2015 | Brown | ................. | F16C 19/364 |
| 2009/0080824 A1 * | 3/2009 | Joki | ........................ | F16C 25/08 |
| | | | | 384/557 |
| 2012/0106884 A1 | 5/2012 | Doerrfuss et al. | | |
| 2012/0106886 A1 | 5/2012 | Ince et al. | | |

FOREIGN PATENT DOCUMENTS

| | | | | |
|---|---|---|---|---|
| DE | 102009056615 A1 | | 6/2011 | |
| DE | 102010009116 A1 | | 8/2011 | |
| DE | 102010052842 A1 * | | 5/2012 | ............ F16C 19/364 |
| JP | 2007100792 A * | | 4/2007 | ............ F16C 25/08 |
| WO | WO 2009040172 A1 * | | 4/2009 | ............ F16C 25/08 |

* cited by examiner

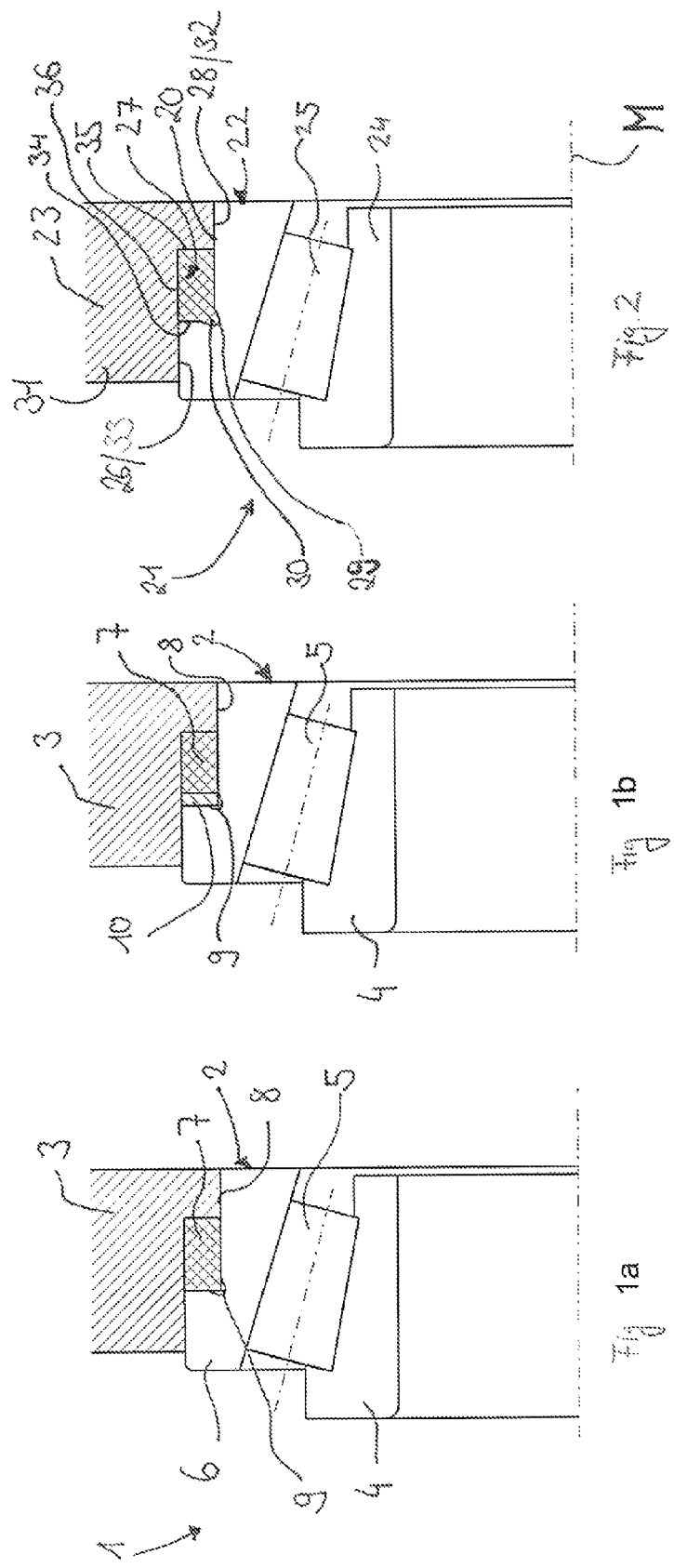

BEARING RING INCLUDING A TEMPERATURE COMPENSATION RING, BEARING INCLUDING THE BEARING RING, AND METHOD FOR MANUFACTURING A BEARING RING

CROSS-REFERENCE

This application claims priority to German patent application no. 10 2014 207 922.5 filed on Apr. 28, 2014, the contents of which are fully incorporated herein by reference.

TECHNOLOGICAL FIELD

Exemplary embodiments relate to a bearing ring including a temperature compensation ring, as well as a bearing including the bearing ring, and a method for manufacturing a bearing ring.

BACKGROUND

In many applications bearings are subjected to different temperature conditions. Sometimes the bearing (or parts of the bearing) are disposed on components that respond to temperature changes differently than the bearing. For example, the components may expand or deform differently in response to a temperature change. This may occur, for example, when rolling-element bearings are used in an aluminum housing. Therefore, in some cases, temperature compensation elements are provided between a ring of the rolling-element bearing and the housing.

Conventional rolling-element bearings are known that have a flange on an outer ring. The flange is disposed in a first region on an outer surface of the outer ring and has a larger diameter than a second region on the outer surface of the outer ring. With some conventional outer rings, an elastomer ring is disposed on the second region having the smaller diameter than the flange and functions as an element for temperature compensation. For this purpose the elastomer ring is pushed onto the outer ring, for example.

The elastomer ring usually has a very large thermal expansion coefficient. If the outer ring and the housing expand at different rates, the elastomer ring should expand at such a rate that at least in the axial direction no clearance arises between the housing and the outer ring. This can happen, for example, with a temperature increase or temperature change. The elastomer ring should thus compensate for an increase in clearance which can arise, for example, at an operating temperature.

For manufacturing reasons, conventional bearing outer rings often have an undercut at a boundary between the flange and the outer surface of the outer ring having the smaller diameter. The undercut can be configured as a radially encircling groove.

When forces act on the temperature-compensation ring, it begins to deform and, in a certain sense, flow. In some cases this can cause a part of the elastomer ring to flow into the groove, and thus a volume of the temperature compensation ring, i.e., the volume that has flowed into the groove, is not available for the compensation of the clearance. To prevent this, in some conventional outer rings the groove is covered by a ring or plate or a metal-plate ring, which is an additional component of the bearing system. In addition, a further assembly step is required to install this further component. These difficulties with temperature compensation may be present in any bearings and their bearing rings.

There is therefore a desire to balance the need to compensate for a clearance with the need to simply the installation of a bearing ring and at the same time ensure the reliably of the assembly.

SUMMARY

This need is addressed by a bearing ring according to embodiments of the present disclosure.

Exemplary embodiments relate to a bearing ring including a temperature compensation ring made from an elastic material. The temperature compensation ring is vulcanized on or onto a radial outer surface of the bearing ring. Since the temperature compensation ring is vulcanized onto the bearing ring, in some exemplary embodiments the temperature compensation ring can be connected in an interference-fit or materially bonded manner to the bearing ring or its outer surface. This avoids leaving a cavity, empty space, or intermediate space between the bearing ring and the temperature compensation ring, a space into which the temperature compensation ring or its material could flows if it is subjected to pressure or force. The entire volume of the temperature compensation ring can then optionally be used for a compensation of axial clearance.

The temperature compensation ring can at least sectionally comprise an elastomer. In some exemplary embodiments the temperature compensation ring can thereby receive its elastic property and its capacity for temperature compensation. Furthermore, the temperature compensation ring could thus be suitable for manufacturing in a vulcanization method. A component having a capacity for temperature compensation, for example, the temperature compensation ring, can have the ability to fill a space between two components, which possibly increases with a temperature increase. For this purpose the component can, for example, be preloaded and/or expand with the temperature increase.

An elastic material vulcanized onto a surface, for example, the outer surface of the bearing ring, can be connected to the surface, for example, in an interference-fit or materially-bonded manner. For this purpose the material can optionally be fluidly poured onto the surface or molded onto it in another manner.

In some further exemplary embodiments the bearing ring includes a first region and a second region on the outer surface. The second region has a larger diameter than the first region. In this way an end surface oriented in an axial direction extends from the first to the second region. The temperature compensation ring abuts with its ring end surface on the axial end surface between the two regions. In some exemplary embodiments another axial ring end surface of the temperature compensation ring is oriented towards a stop in a housing or a stop on a shaft. The ring end surfaces can, for example, be disposed opposite each other in the axial direction. If the shaft and/or the housing expands differently from the bearing ring, an axial clearance can arise between the axial end surface of the bearing ring and a stop of the shaft or of the housing. By expanding, the temperature compensation ring can in some exemplary embodiments compensate for this clearance and possibly prevent a cavity from arising between the components.

The temperature compensation ring can, for example, have a rectangular cross-section. In some exemplary embodiments, in an unloaded state the temperature compensation ring can thus have as great a number as possible of contact surfaces in common with the outer ring and/or the adjacent component. The occurrence of cavities between the temperature compensation ring and the adjacent components could thereby be avoided.

For manufacturing-related reasons, in some exemplary embodiments the bearing ring has a radially encircling groove or an undercut at the boundary between the first region and the second region. Since the temperature compensation ring may be vulcanized onto the outer surface, even in an unloaded state the temperature compensation ring or its elastic material fills the groove in an interference-fit manner. Since the groove is already filled by the temperature compensation ring or the material of the temperature compensation ring, the temperature compensation ring can no longer deform into the groove. A cross-sectional shape of the temperature compensation ring can thus have a radially encircling bulge, which corresponds to a negative imprint of the groove of the bearing ring. In other words, the shape of the bulge is complementary to the shape of the groove.

In some further exemplary embodiments the bearing ring is an outer ring. In this case the outer surface is oriented radially outward. The outer ring can optionally be installed in a housing. In many cases a clearance can then arise between the housing and the outer ring, for example in response to a temperature change. In this case the temperature compensation ring can possibly expand and compensate for the clearance.

The bearing ring can optionally also be formed as an inner ring that is mounted on a shaft. Then the outer surface on which the temperature compensation ring is disposed can be oriented radially inward. The temperature compensation ring on the inner ring can then possibly compensate for a clearance between the inner ring and a stop of the shaft.

Exemplary embodiments further relate to a bearing including the bearing ring according to at least one of the exemplary embodiments. The bearing can be a sliding bearing or a rolling-element bearing. Thus with different bearing types, a different behavior of the bearing components relative to that of the components on which the bearing components are mounted could be compensated for.

Exemplary embodiments also relate to a method for manufacturing a bearing ring. In the method a temperature compensation ring made from an elastic material is vulcanized onto an outer surface of a bearing ring. In some exemplary embodiments the temperature compensation ring can thereby be connected in an interference-fit and/or materially-bonded manner to the bearing ring or its outer surface. In some exemplary embodiments the occurrence of gaps, cavities, or intermediate spaces between the temperature compensation ring and the bearing ring can thus be avoided. Thus the total volume of the temperature compensation ring can be used for compensating for an axial clearance that might arise between the bearing ring and a component on which it is mounted.

In many cases a liquid material, for example, rubber or an elastomer is provided for vulcanizing to form the temperature compensation ring. In some exemplary embodiments the temperature compensation ring is molded from liquid material applied directly onto the bearing ring so that the temperature compensation ring adheres onto an outer surface of the bearing ring in an interference-fit and/or materially-bonded manner. The liquid material can subsequently dry or harden.

To prevent the elastic material of the temperature compensation ring from cooling off too quickly and thus solidifying during the vulcanizing or molding process, in some exemplary embodiments the bearing ring is tempered during the vulcanization process. For this purpose the bearing ring, or a region of the bearing ring on which the temperature compensation ring is to be disposed, can be heated.

In some exemplary embodiments a mold is disposed on the bearing ring for molding/forming/shaping the temperature compensation ring, and the liquid material is introduced into the mold. For example, boundary surfaces of the temperature compensation ring, which are not located on the bearing ring itself, can be formed by the mold. Thus a shape or a dimension of the temperature compensation ring can be determined in a simple manner. In some exemplary embodiments it is not possible to position the mold on the bearing ring or its outer surface in a completely sealing or enclosing manner. In such cases, some of the liquid material can escape between the mold and the bearing ring and cover other regions of the bearing ring wherein no temperature compensation ring is actually needed. These regions can optionally represent assembly surfaces that are configured to come into contact with other components. Therefore in some exemplary embodiments the material is removed from the outer surface in regions outside the temperature compensation ring. The material removed can be, for example, still liquid, already hardened, or dried.

BRIEF DESCRIPTION OF THE DRAWINGS

Further advantageous designs are described in more detail below with reference to the exemplary embodiments depicted in the drawings, but not limited to said exemplary embodiments.

The Figures thus schematically show the following views.

FIG. 1a is a schematic cross-sectional view of a bearing including a conventional bearing ring.

FIG. 1b is a schematic cross-sectional view of a bearing including another conventional bearing ring.

FIG. 2 is a schematic cross-sectional view of a bearing including a bearing ring according to an exemplary embodiment.

DETAILED DESCRIPTION

Figure 3:
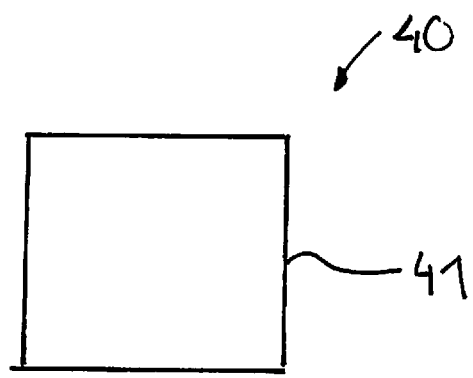
FIG. 3 is a schematic depiction of a method for manufacturing a bearing ring according to an exemplary embodiment.

In the following description of the accompanying Figures, like reference numbers are used to refer to like or comparable components. Furthermore, summarizing reference numbers are used for components and objects that appear multiple times in an exemplary embodiment or in an illustration, but that are described together in terms of one or more common features. Components or objects that are described with the same or summarizing reference numbers can be embodied identically, but also optionally differently, in terms of individual, multiple, or all features, their dimensions, for example, as long as the description does not explicitly or implicitly indicate otherwise.

FIG. 1a is a schematic cross-sectional view of a tapered roller bearing 1 that includes a conventional bearing ring as an outer ring 2.

The tapered roller bearing 1 also comprises an inner ring 4. A plurality of tapered rollers 5 are guided between the outer ring 2 and the inner ring 4, only one of which is depicted. The outer ring 2 includes a flange 6 that serves to position the tapered roller bearing 1 in an axial direction.

The tapered roller bearing 1 is a conventional tapered roller bearing having temperature compensation abilities. To this end, an elastomer ring is disposed as a temperature compensation ring 7 adjacent to the flange 6 in the axial direction. The temperature compensation ring 7 has a rectangular cross-section. Furthermore, the temperature compensation ring 7 has a very high thermal expansion coefficient. For example, the temperature compensation ring 7 can comprise as material fluoroelastomer (FPM) or hydrogenated nitrile butadiene rubber (HNBR). Furthermore, the temperature compensation ring 7 can be formed from any other elastic material or elastomer having a high thermal expansion coefficient.

The outer ring 2 is disposed in a housing 3. The housing 3 is an aluminum housing of a transmission. Two tapered roller bearings 5, of which only one is depicted in FIG. 1, can be installed therein, for example in an X-arrangement. At some operating temperatures an increase in clearance can result due to the different coefficients of thermal expansion of the materials of the outer ring 2 and the housing 3. The temperature compensation ring 7 is intended to compensate for this clearance because a clearance should be prevented from occurring in the axial direction M between the outer ring 2 and the housing 3.

A radially encircling groove 9 having a smaller radius than the flange 6 is present as a recess or undercut between the flange 6 and an outer ring surface diameter 8. The groove 9 results from production requirements of the outer ring. Under certain circumstances the material of the temperature compensation ring 7 can behave like a fluid, and if the temperature compensation ring 7 is subjected to pressure or force, the material that forms the temperature compensation ring 7 can be at least partially displaced into the groove 9. This can happen, for example, due to the temperature increase with concomitant volume expansion. A part of the axial clearance compensation which should be effected by the temperature compensation ring 7 is lost due to this "filling" of the groove 9 by a part of the temperature compensation ring 7.

FIG. 1b shows a schematic cross-sectional view of the tapered roller bearing 1 including a further conventional bearing ring as outer ring 2.

In order to prevent part of the temperature compensation ring 7 from flowing into the groove 9 and being lost for axial clearance compensation, in the conventional outer ring 2 of FIG. 1b the groove 9 is covered by a ring or plate or a metal-plate ring 10.

This conventional solution requires that two elements, the metal-plate ring 10 and the temperature compensation ring 7, be installed. Therefore two components are needed. The assembly time and a cost of materials is thereby increased for the tapered roller bearing 1. Furthermore, the temperature compensation ring 7 is shortened in the axial direction by a width of the metal-plate ring, and thus the ability of the temperature compensation ring to perform its temperature compensation function can be reduced because less material is available for temperature compensation purposes. The metal-plate ring 10 is also not well suited for compensating for nonuniform deformation of the outer ring 2 and the housing 3.

FIG. 2 shows a schematic cross-sectional view of a bearing 21 including an outer ring as bearing ring 22 according to an exemplary embodiment.

The bearing 21 also comprises an inner ring 24. A plurality of tapered rollers 25 are guided between the bearing ring 22 and the inner ring 24, only one of which is depicted. The bearing 21 is thus configured substantially analogous to the tapered roller bearing 1, but is differentiated by the bearing ring 22. The bearing ring 22 depicted in FIG. 2 includes a temperature compensation ring 27 made from an elastic material that is vulcanized onto an outer surface 20 of the bearing ring 22, which outer surface is oriented in a radial direction.

The bearing 21 is disposed, like the tapered roller bearing 1 of FIG. 1, in a housing 23. The housing 23 includes a first region 32 having an inner diameter that corresponds to an outer diameter of the first region 28. Furthermore, the housing 23 includes a second region 33 having an inner diameter that corresponds to an outer diameter of a second region 26. The second region 33 of the housing 23 has a greater extension in the axial direction than the second region 26 of the bearing ring 22. The outer surface 20 is oriented radially outward. In an installed state a space thus arises between the housing 23 and the bearing 22, which space is filled by the temperature compensation ring 27.

The temperature compensation ring 27 has a substantially rectangular cross-section as its main cross-section. The temperature compensation ring can also have, for example, any other cross-sectional shape. The cross-section can be configured, for example, to be oval, square, round, etc. In some further exemplary embodiments, the temperature compensation ring has a shape that is configured such that a largest-possible abutment surface to adjacent components arises.

A radially extending bulge 30 protrudes from the main- or rectangular-cross-section, which bulge 30 extends into a groove 29. The groove 29 is configured analogous to the groove 9. The bulge 30 thus has the shape of a negative imprint of the groove 29, that is, it is complementary to the shape of the groove 29. The bulge 30 arises when a still-liquid material of the temperature compensation ring 27 penetrates into the groove 29 during the process of vulcanizing the temperature compensation ring 27 onto the bearing ring. During the manufacturing of the temperature compensation ring 27, it or the still-liquid material connects in an interference-fit and/or materially-bonded manner to the outer surface 20 and thus also to the surface of the groove 29. Furthermore, the temperature compensation ring 27 also connects in an interference-fit and/or materially-bonded manner to an end surface 34, oriented in an axial direction, which is formed between the first region 28 and the second region 26. The connection to the surface can be effected, for example, without other fillers, adhesives, or further materials. In other words, the temperature compensation ring can be attached directly to the outer surface of the bearing ring, i.e. optionally without adhesive.

The temperature compensation ring 27 has a very high thermal expansion coefficient. For example, the temperature compensation ring 27 can comprise as material fluoroelastomer (FPM) or hydrogenated nitrile butadiene rubber (HNBR), a fluoroelastomer (for example with the trade name "Viton") or an elastomer. The temperature compensation ring 27 can, for example, also be formed from any other elastic material having a high thermal expansion coefficient. As used herein, "very high thermal expansion coefficient" is a thermal expansion coefficient greater than that of the metal to which the temperature compensation ring is attached and a thermal expansion coefficient that allows a given temperature compensation ring to expand enough to compensate for temperature changes encountered during bearing use.

The temperature compensation ring 27 has a greater extension in the axial direction than the temperature compensation ring 7. This is possible because in the outer ring 22 according to the exemplary embodiment, no metal-plate ring for covering the groove 29 is needed. Therefore, in an unloaded state (and indeed at all times) the temperature compensation ring 27 extends into the groove 29, and when the temperature compensation ring 27 is subjected to pressure no material is lost into the groove 29 because the groove is already full. For example, the material of the temperature compensation ring 27 may have a temperature resistance up to approximately 150° C. Furthermore, in some exemplary embodiments the temperature compensation ring 27 can be resistant to various transmission oils including high-additive transmission oils.

In many cases a mold (not-illustrated) is used for vulcanizing the temperature compensation ring 27 onto a bearing ring. The mold includes, for example, a boundary surface on which an annular end surface 35 of the temperature compensation ring 27 is formed. The annular end surface 35 is oriented in an axial direction of the temperature compensation ring 27 and opposes the end surface 34 in the axial direction. Furthermore, the mold can have a boundary for an annular outer surface 36 of the temperature compensation ring 27, which annular outer surface 36 is oriented in a radial direction. The mold can also have in- and out-flows for the still-liquid material that later forms the temperature compensation ring 27.

In many cases it can be difficult to position the mold close enough to form a seal to the outer surface 20 and/or the end surface 34 of the bearing ring 22. The liquid material being used to form the temperature compensation ring can thus leak onto surfaces of the first region 28 and of the second region 26 and form a layer, albeit a very thin layer, here. Since the regions 28 and 26 serve for attaching the bearing ring 22 in the housing 23, in some cases the material must be removed from these surfaces after the vulcanizing-on of the temperature compensation ring 27 to the bearing ring 22. For this purpose that material can be scraped off, for example, in a hardened or dried state.

FIG. 3 shows a schematic depiction of a method 40 for manufacturing a bearing ring according to an exemplary embodiment.

As shown in FIG. 3, the method 40 comprises a process 41 in which a temperature compensation ring made from an elastic material is vulcanized onto an outer surface of a bearing ring.

It can thus be made possible that the temperature compensation ring abuts flush on the second region, i.e. on a flange of the bearing ring. It can thereby be avoided, or at least the risk can be reduced, that cavities form between the temperature compensation ring and a surface of the bearing ring, into which cavities the material of the bearing ring could be displaced.

In some exemplary embodiments of the method 40 the temperature compensation ring is vulcanized as an elastomer ring directly onto the outer ring. During the vulcanizing process a groove or an undercut is thereby also filled with the elastomer material. The metal-plate ring and/or a grinding of the flange or of the end surface 34 that were sometimes required in conventional arrangements can thus be omitted.

A bearing ring or a bearing according to at least one of the exemplary embodiments can be used in any possible application, not only as described in transmissions that have an aluminum housing. For example, a bearing ring or outer ring according to at least one of the exemplary embodiments can be used in any bearing. Furthermore, the bearing ring or outer ring can be used in a rolling-element bearing on which axial forces act. The bearing rings can optionally be used in all possible bearing assemblies, for example, machine tools, machinery, vehicles, or the like.

The exemplary embodiments and their individual features disclosed in the above description, the following claims, and the accompanying Figures can be meaningful and implemented both individually and in any combination for the realization of an exemplary embodiment in its various designs.

Representative, non-limiting examples of the present invention were described above in detail with reference to the attached drawings. This detailed description is merely intended to teach a person of skill in the art further details for practicing preferred aspects of the present teachings and is not intended to limit the scope of the invention. Furthermore, each of the additional features and teachings disclosed above may be utilized separately or in conjunction with other features and teachings to provide improved bearings having temperature compensation rings.

Moreover, combinations of features and steps disclosed in the above detailed description may not be necessary to practice the invention in the broadest sense, and are instead taught merely to particularly describe representative examples of the invention. Furthermore, various features of the above-described representative examples, as well as the various independent and dependent claims below, may be combined in ways that are not specifically and explicitly enumerated in order to provide additional useful embodiments of the present teachings.

All features disclosed in the description and/or the claims are intended to be disclosed separately and independently from each other for the purpose of original written disclosure, as well as for the purpose of restricting the claimed subject matter, independent of the compositions of the features in the embodiments and/or the claims. In addition, all value ranges or indications of groups of entities are intended to disclose every possible intermediate value or intermediate entity for the purpose of original written disclosure, as well as for the purpose of restricting the claimed subject matter.

REFERENCE NUMBER LIST

1 Tapered roller bearing
2 Outer ring
3 Housing
4 Inner ring
5 Tapered roller
6 Flange
7 Temperature compensation ring
8 Outer surface
9 Groove
10 Metal-plate ring
20 Outer surface
21 Bearing
22 Bearing ring
23 Housing
24 Inner ring
25 Rolling element
26 Second region
27 Temperature compensation ring
28 First region
29 Groove
30 Bulge
31 Axial end
32 First region
33 Second region
34 End surface
35 Annular end surface
36 Annular outer surface 40 Method
41 Vulcanizing-on
M Axial direction

What is claimed is:

1. A bearing ring including a temperature compensation ring made from an elastic material vulcanized onto an outer surface of the bearing ring, the outer surface being oriented in a radial direction, such that first and second surfaces of the temperature compensation ring contact the bearing ring and third and fourth surfaces of the temperature compensation ring contact a housing,
    wherein the bearing ring further includes a radially encircling groove, and
    wherein in an unloaded state of the temperature compensation ring, the temperature compensation ring fills the groove in an interference-fit manner.

2. The bearing ring according to claim 1, wherein the temperature compensation ring comprises an elastomer.

3. The bearing ring according to claim 1, further comprising a first region and a second region on the outer surface,
    wherein the second region has a larger diameter than the first region, and
    wherein between the first region and the second region the temperature compensation ring abuts on an end surface oriented in an axial direction.

4. The bearing ring according to claim 3, wherein the groove is disposed at the boundary between the first region and the second region.

5. The bearing ring according to claim 1, wherein the bearing ring is an outer ring and the outer surface is oriented radially outward.

6. A bearing including the bearing ring according to claim 1.

7. The bearing ring according to claim 1, further comprising a first region and a second region on the outer surface,
    wherein the second region has a larger diameter than the first region,
    wherein between the first region and the second region the temperature compensation ring abuts on an end surface oriented in an axial direction,
    wherein the groove is disposed on the boundary between the first region and the second region, and
    wherein the temperature compensation ring comprises an elastomer.

8. The bearing ring according to claim 1, wherein the temperature compensation ring has a first side and a second side substantially perpendicular to the first side and an annular bead connecting the first side to the second side.

9. The bearing ring according to claim 1, wherein the temperature compensation ring fills the groove in the interference-fit manner independently of an application of axial pressure against the temperature compensation ring.

10. A bearing ring including a temperature compensation ring made from an elastic material materially bonded onto an outer surface of the bearing ring, the outer surface being oriented in a radial direction, such that first and second surfaces of the temperature compensation ring contact the bearing ring and third and fourth surfaces of the temperature compensation ring contact a housing,
    wherein the bearing ring further includes a radially encircling groove, and
    wherein the temperature compensation ring fills the groove in an interference-fit manner independently of an application of axial pressure against the temperature compensation ring.

11. The bearing ring according to claim 10, wherein an elastic material materially bonded onto an outer surface comprises the elastic material vulcanized onto the outer surface.

12. The bearing ring according to claim 10, wherein the temperature compensation ring has a first side and a second side substantially perpendicular to the first side and an annular bead connecting the first side to the second side, the annular bead being located in the groove.

* * * * *